C. W. PUTNAM.
STRENGTH TESTING MACHINE.
APPLICATION FILED JAN. 27, 1909.

924,625.

Patented June 8, 1909.

WITNESSES:

INVENTOR.
Clesson W. Putnam.
BY
ATTORNEY.

UNITED STATES PATENT OFFICE.

CLESSON W. PUTNAM, OF HOLYOKE, MASSACHUSETTS, ASSIGNOR TO B. F. PERKINS AND SON, INCORPORATED, OF HOLYOKE, MASSACHUSETTS, A CORPORATION OF MASSACHUSETTS.

STRENGTH-TESTING MACHINE.

No. 924,625.  Specification of Letters Patent.  Patented June 8, 1909.

Application filed January 27, 1909. Serial No. 474,608.

*To all whom it may concern:*

Be it known that I, CLESSON W. PUTNAM, a citizen of the United States of America, and resident of Holyoke, in the county of Hampden and State of Massachusetts, have invented certain new and useful Improvements in Strength-Testing Machines, of which the following is a full, clear, and exact description.

This invention relates to improvements in apparatuses for testing the strength of sheet materials, such as paper, textile or knit fabrics and the like, by determination of the maximum capability of the fabric for resisting strains or pressure imparted thereagainst transversely of the surface thereof; and it particularly pertains to a somewhat well known type of testing apparatus which comprises a fabric supporting, apertured, platform having, overlying the aperture thereof an elastic diaphragm, a fluid having a distending coaction with the diaphragm, means for indicating the strain or pressure exerted by the fluid, and an openwork fabric clamp coöperating with the platform.

It has been found in an apparatus of the class described wherein the diaphrams, which are renewable as occasion requires, in sometimes bursting while a test is being made and observed by one or several persons, results in a promiscuous throwing or dissemination of the unduly liberated diaphragm actuating glycerin, or other liquid, so as to injure the clothing of the persons in proximity to the instrument and otherwise in various ways causing inconvenience and damage.

The present invention comprises in combination with the skeleton like fabric clamp which coöperates with the fabric supporting, apertured diaphragm platform, in an apparatus of the character described, a casing preferably of transparent material for inclosing the openwork clamp and serving to prevent any upward and outward throwing or scattering of the glycerin or other liquid in case of bursting of the diaphragm.

The invention furthermore comprises certain specific combinations and arrangements of parts and the constructions of parts as hereinafter particularly described in conjunction with the accompanying drawings, and all as set forth in the claims.

Figure 1:
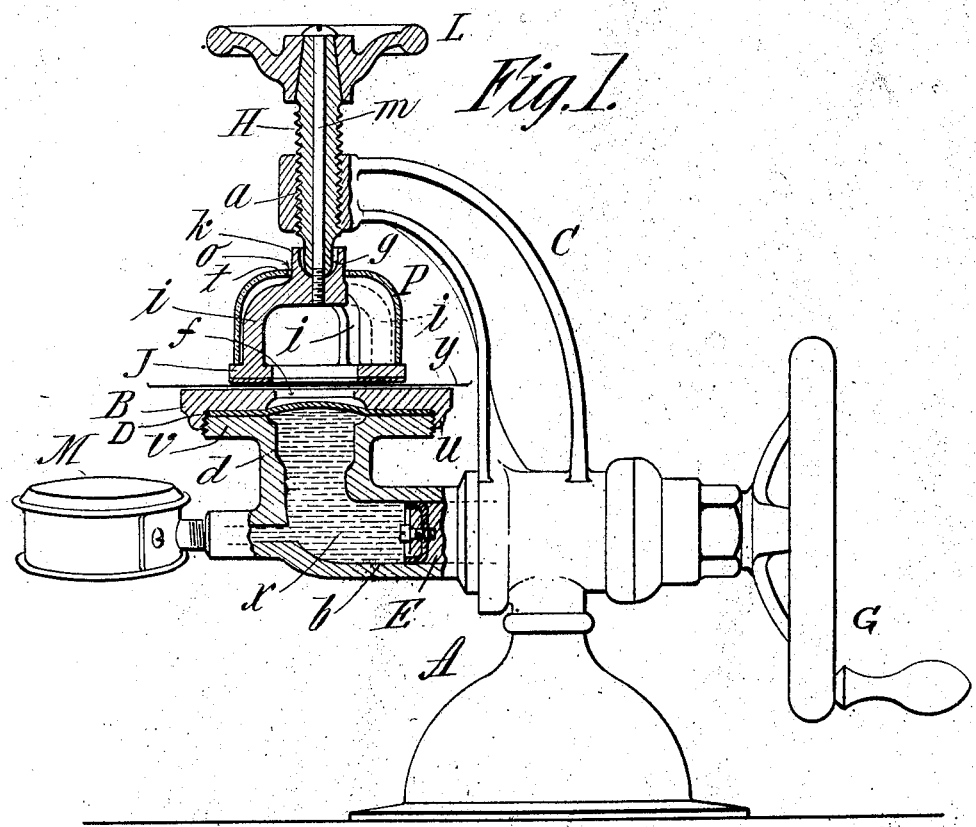
Figure 2:
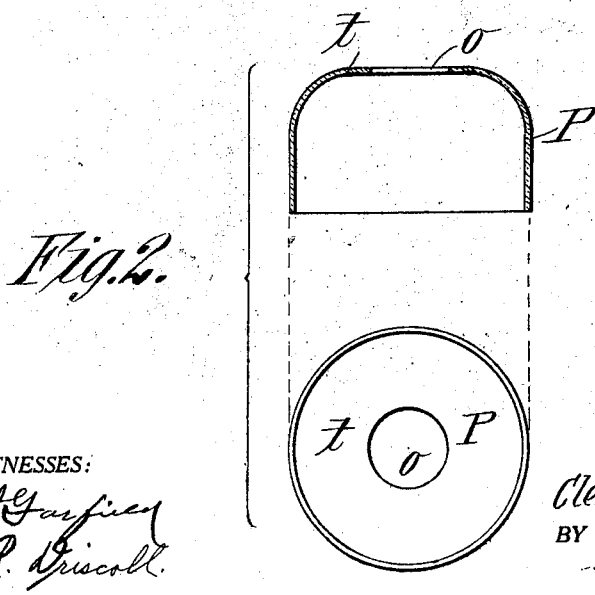

In the drawings:—Figure 1 is a sectional elevation of a testing machine comprising as a part thereof the present improvements; Fig. 2 is a plan and projected central section of the casing.

In the drawings:—A represents the frame of the testing apparatus comprising a fabric supporting apertured platform B and an arm C extending upwardly and over the platform having a vertical screw threaded aperture $a$ therethrough.

The frame or body of the apparatus has a bore $b$ therein with an upwardly leading branch way $d$ which is traversed and closed by the diaphragm D which is of soft india rubber or other elastic material having fitness to the purpose.

A piston E in the bore is moved axially by the turning of the hand wheel G to displace the glycerin or other fluid in the bore and its branch, —$b$, $d$,— against the diaphragm to distend it upwardly and in a direction transversely of its surface for protrusion through the aperture $f$ in the platform $b$ for its straining effect against the fabric $y$ which is clamped on the platform, by the clamp.

The clamp comprises a base ring J, a hub $k$ above the central opening of the ring,— constructed with an upwardly opening socket $g$ therein,—and a plurality of separated arms $i$ usually three in number, which connect the said base ring J and the hub $k$.

H represents a screw of quite large diameter, having a hand wheel L at its upper end for turning it,—an intermediate portion of said screw threading through the aforesaid aperture $a$ of the frame arm, and having its lower extremity of rounded or semi-spherical form and engaged in the socket $g$ of the hub $k$; and $m$ represents a stem extending loosely through the said screw H, having by its lower extremity a screw engagement in the upper hub provided portion of the clamp, and having at its upper end a head in engagement against the upper end of the operating screw H.

M represents an indicating and registering device subject to and operated by the fluid under pressure in the apparatus.

P represents a casing, preferably formed of glass, although it may be of transparent celluloid or other transparent material, such casing being provided as an inverted cup having an aperture $o$ in the middle of its transverse portion $t$, the casing surrounding the openwork or skeleton clamp, its circular lower edge resting on the marginal portion of the base ring of the clamp while the said aperture accommodates therethrough the hub *k* of the clamp.

Preparatory to using the testing apparatus, and when the clamp is raised, the fabric to be tested is laid on the apertured platform under the clamp and the hand wheel is turned so that the screw H having a downward movement carries the base ring of the clamp (which is usually bushed with a thickness of rubber) to contact against the fabric; and inasmuch as there might be a tendency of the clamp to weaken or rupture the fabric if it were to have a revoluble movement in contact on the latter while the final clamping pressure is being imparted by the powerful action of the operating screw H, the capability of the clamp to remain at rest on coming against the fabric while the operating screw is being further turned for acquiring the hard clamping bind is of appreciable importance;—this capability just referred to being rendered possible by the substantially ball and socket engagement between the screw H and clamp and the long screw or stem *m* connecting the operating screw H and clamp, and relatively to which element *m* the operating screw has a rotative motion.

In the ordinary utilization of the tester the hand wheel G is turned to move the piston F which displaces the liquid *x* to upwardly distend the elastic diaphragm against the portion of the fabric overlying the aperture in the platform and within the central opening of the annular clamp base; and the distortion and final rupturing of the fabric may be observed through the transparent casing P as well also as will be seen the progression of the indicator M and the maximum registration thereof.

It is, of course, expected in these testers, that the elastic rubber diaphragms will in time deteriorate and renewable diaphragms are provided to replace old ones as easily possible by the making of the upper part of the fabric supporting platform in the form of a flat topped ring having a depending internally threaded flange *u* to screw engage the edge of the portion *v* of the frame; and while it may never be known just when one of the elastic diaphragms is liable to burst, little concern, however, need be had on that account because of the provision of the clamp inclosing transparent casing P which, in the event of the bursting of the diaphragm confines within the chamber inclosed thereby the diaphragm actuating glycerin or other liquid, and precludes the possibility of the latter being thrown upwardly around and about the instrument to be scattered on persons observing a test and upon adjacent objects.

I claim:—

1. The combination, in a strength testing machine comprising a fabric supporting apertured platform having an elastic diaphragm, a fluid having connection with the diaphragm, means for imparting a diaphragm distending pressure on the fluid, means for indicating the strain or pressure exerted by the fluid, and a skeleton fabric clamp coöperating with the platform, and means for operating it,—of a casing for inclosing said skeleton clamp and serving to prevent a dissemination of the liquid around and about the apertured platform in case of bursting of the diaphragm.

2. In a strength testing machine comprising a fabric supporting, apertured, platform having a fluid operated elastic diaphragm, means for indicating the strain exerted by the fluid, and a skeleton fabric clamp coöperating with the platform, and means for operating it,—a transparent casing surrounding and inclosing said skeleton clamp, for the purposes set forth.

3. In a strength testing machine comprising a fabric supporting apertured platform provided with a fluid operated elastic diaphragm, a fabric clamp comprising a base ring, a hub above the central opening of the ring and a plurality of separated arms connecting the base ring and said hub, means, connected with said hub, for forcing the clamp against the platform and retiring it therefrom, and an inverted cup shaped transparent casing having an aperture in the middle of its transverse portion, said casing surrounding the openwork clamp and having the hub of the latter accommodated through said aperture.

4. In a strength testing machine a fabric supporting platform provided with a fluid operated elastic diaphragm, a fabric clamp comprising a base ring, a hub above the central opening of the base ring and a plurality of separated arms connecting the base ring and said hub, means for reciprocating the clamp relatively to the platform and an inverted centrally apertured cup shaped transparent casing, which rests, by its lower edge, on the marginal portion of the base ring of the clamp and surrounds and incloses the clamp, for the purposes set forth.

5. In a strength testing machine, in combination, a frame comprising a fabric supporting apertured platform and an arm extending upwardly and over the platform having a vertical screw threaded aperture therethrough, a fluid operated elastic diaphragm connected with the apertured platform, a fabric clamp comprising a base ring, a hub above the central opening of the ring having an upwardly opening socket therein, and a plurality of separated arms connecting the base ring and said hub, a screw having a hand wheel at its upper end, intermediately threading through said aperture of the frame arm and having its lower extremity engaged in said socket, a stem extending through said screw and having its lower extremity screw engaged with said hub, and an inverted cup shaped transparent casing, apertured in the middle of its transverse portion, surrounding and inclosing the openwork clamp, for the purposes set forth.

6. In a strength testing machine, in combination, a frame comprising a fabric supporting apertured platform and an arm extending upwardly and over the platform having a vertical screw threaded aperture therethrough, a fluid operated elastic diaphragm connected with the apertured platform, a fabric clamp comprising a base ring, a hub above the central opening of the ring having an upwardly opening socket therein, and a plurality of separated arms connecting the base ring and said hub, a screw having a hand wheel at its upper end, intermediately threading through said aperture of the frame arm and having its lower extremity engaged in said socket, and a stem extending through said screw and having its lower extremity screw engaged with said hub.

Signed by me at Springfield, Mass., in presence of two subscribing witnesses.

CLESSON W. PUTNAM.

Witnesses:
W<small>M</small>. S. BELLOWS,
G. R. DRISCOLL.